US006163682A

United States Patent [19]

Lee

[11] Patent Number: 6,163,682

[45] Date of Patent: Dec. 19, 2000

[54] METHOD AND APPARATUS FOR AUTOMATICALLY EXTRACTING AND RETRACTING AN ANTENNA IN A WIRELESS TELEPHONE

[75] Inventor: Han-Sang Lee, Kyeongsangnam-do, Rep. of Korea

[73] Assignee: Samsung Electronics Co., Ltd., Rep. of Korea

[21] Appl. No.: 09/163,671

[22] Filed: Sep. 30, 1998

[30] Foreign Application Priority Data

Sep. 30, 1997 [KR] Rep. of Korea ...................... 97-50275

[51] Int. Cl.[7] ...................................................... H04Q 7/32

[52] U.S. Cl. .............................................. 455/90; 455/550

[58] Field of Search ............................. 455/90, 550, 575, 455/269; 343/715

[56] References Cited

U.S. PATENT DOCUMENTS

| | | | |
|---|---|---|---|
| 4,857,813 | 8/1989 | Matsumoto et al. | 318/54 |
| 4,942,311 | 7/1990 | Harada | 327/143 |
| 4,990,929 | 2/1991 | Nakase et al. | 343/715 |
| 5,212,725 | 5/1993 | Yamamoto et al. | 455/550 |
| 5,497,506 | 3/1996 | Takeyasu | 455/90 |
| 5,689,821 | 11/1997 | Shimazaki | 455/90 |

*Primary Examiner*—Daniel S. Hunter
*Assistant Examiner*—Myron K. Wyche
*Attorney, Agent, or Firm*—Dilworth & Barrese, LLP

[57] ABSTRACT

In a wireless telephone, when an operation such as opening or closing of a front flip cover or a key operation of communication-start or communication-end occurs, a controller obtains information for extraction or retraction of an antenna. Based on the above information, the controller controls a motor-driving by intermittently supplying a motor-driving signal by which the motor can rotate clockwise or counterclockwise during a preset time necessitated for fully extracting and retracting an antenna. While motor-driving, if a blocking force is applied to an antenna, the controller repeatedly stops supplying of the driving signals to the motor for a predetermined interval and then resumes supplying the signals. A gear unit is tightly coupled in a body with the motor, receives a rotating force from the motor shaft, and extracts and retracts an antenna. In addition, there is further provided a fixing element for fixing the motor and the gear unit to an antenna housing, which is able to absorb external impact transferred to the motor and the gear unit through an antenna and to absorb a vibration of the motor. When a front flip cover is opened or a communication-start key is pushed by a user to use the wireless telephone, the antenna is automatically extracted from the antenna housing, while when the front flip cover is closed or a communication-end key is pushed, the antenna is automatically retracted into the antenna housing.

27 Claims, 13 Drawing Sheets

METHOD AND APPARATUS FOR AUTOMATICALLY EXTRACTING AND RETRACTING AN ANTENNA IN A WIRELESS TELEPHONE

BACKGROUND OF THE INVENTION

1. Field of the Invention

The present invention relates to an antenna driving apparatus and method in a wireless communication device, particularly to a method and apparatus for automatically driving an antenna of a wireless telephone with a sliding-embedded type antenna in which, by driving a motor, at the start of communication the antenna is automatically extended from an antenna housing, and reversely at the end of communication automatically retracted into the antenna housing.

2. Description of the Prior Art

Nowadays, generally a conventional wireless telephone, for example a cellular phone, a city phone, personal communication system (PCS) or the like, adopts a sliding-embedded type of antenna. A study teaches us that the intensity of electro-magnetic wave radiated when we use a wireless phone in a state of an antenna being fully extracted from an antenna housing is ⅓ as high as when we use the wireless phone in a state of the antenna being fully embedded in the antenna housing. Accordingly, using a wireless phone in the state that the antenna is fully extracted from the antenna housing, reduces the harm which may occur in a user's health due to the electro-magnetic wave radiated from the antenna.

Today, we can even find some conventional wireless telephones adopting a manually driven type of antenna in which a user himself manually extends or retracts an antenna from/into an antenna housing at the start or end of communication, respectively. But, to avoid this inconvenience, some other wireless phones adopting an automatic antenna extension/retraction system are disclosed.

An automatic antenna driving technique, U.S. Pat. No. 5,497,506 issued to Shinji Takeyasu, is disclosed. In order to overcome a problem of a prior art which adopts a spring-loaded type antenna where the antenna can be extracted by pressing a button from an antenna housing but a user should manually push the antenna into the antenna housing for retraction of the antenna, Shinji Takeyasu's patent suggests an antenna operating apparatus which comprises three operation switches of "OFF", "STANDBY" and "TALK" for antenna movement, wherein the antenna is extracted when "TALK" is selected and retracted when "STANDBY" is selected.

However, in this antenna moving mechanism, since a screw rod on which a nut is formed should be mounted on a motor shaft, a nut should be formed at the bottom of the antenna, and the antenna is vertically extracted and retracted by means of both engaged rotating nuts, a dedicated antenna is necessary for this moving mechanism. This generates a new problem of incompatibility with a currently used conventional wireless telephones. In addition, there is no solution for troubles caused by a deformation or a bending of the antenna due to an external disturbing force which may be frequently applied during antenna movement or during long-term usage, and it has some problems in system durability and stability of system operation.

SUMMARY OF THE INVENTION

A first object of the present invention is to provide a control method for automatically extracting/retracting an antenna by self-recognizing a user's action of starting or ending communication, reducing the number of times of changing a battery by minimizing power consumption while driving an antenna, protecting against damage caused by mechanical and electrical shock due to external disturbing force, and having the flexibility of being able to change an antenna driving condition in software.

Moreover, a second object of the present invention is to provide an apparatus for automatically extending/retracting an antenna which not only secures the convenience, stability and flexibility pursued by the first object, but requires no change in the structure of a conventional sliding-embedded type antenna, and which, in order to keep pace with a current technical trend to minimize the size of a wireless telephone, minimizes the size thereof so that the apparatus can easily be mounted in the antenna housing of a conventional wireless telephone after only little modification of the antenna housing structure.

Accordingly, to achieve the first object, a method is provided for automatically extracting and retracting an antenna from/into an antenna housing in a wireless communication device, comprising the steps of: i) obtaining information for extraction and retraction of said antenna from electric signals corresponding to communication-start operation and communication-end operation of said wireless communication device; ii) based on said information, supplying a motor with a motor-driving signal to rotate said motor clockwise and counter-clockwise to drive said motor; iii) in parallel with driving of said motor, accumulating an effective motor-driving time, and comparing said accumulated motor-driving time with a preset-time during which said antenna is fully extracted or retracted from or into said antenna housing in a case where there is no disturbance in driving of said motor, wherein both said accumulating and comparing operations are periodically repeated so long as said motor is driven; iv) based on each of results of said repeated comparing operations, periodically checking whether said motor is loaded over a reference value when said effective motor-driving time is smaller than said preset-time; v) when said motor is loaded over said reference value, repeating within a number of times an operation of interrupting said motor driving signal so that said motor driving signal is not supplied to said motor for a predetermined time until a state that said motor is loaded over said reference value is removed; and vi) based on each of said results of said repeated comparing operations, closing a supply of said motor driving signal to said motor when said effective motor-driving time becomes equal to said preset-time.

In addition, to accomplish the second object, an apparatus is provided for automatically extracting and retracting an antenna from/into an antenna housing of a wireless communication device, the apparatus comprising: i) a motor, including a motor shaft, for rotating said motor shaft clockwise or counterclockwise in correspondence to a supplied motor driving signal to generate a rotating force; ii) a control means for obtaining information for extraction and retraction of said antenna from electric signals corresponding to communication-start operation and communication-end operation of said wireless communication device, and, based on said information, supplying said motor with said motor-driving signals to rotate said motor clockwise and counter-clockwise until a preset-time elapses during which said antenna is fully extracted or retracted from or into said antenna housing in a case where there is no disturbance in the driving of said motor; iii) a gear unit, being detachably and integrally formed with said motor, for applying said antenna with said rotating force transferred from said motor shaft to extract/retract said antenna from/into said antenna housing. The apparatus further comprises a fixing and buffing means for tightly fixing an assembly of the motor and the gear unit to the antenna housing, absorbing a vibration generated when the motor is driven and/or an external disturbing force is transferred to the assembly through the antenna. In addition, the control means intermittently supplies the motor-driving signals to the motor within a predetermined time interval, and while driving the antenna, checks whether driving of the antenna is disturbed, and performs a predetermined routine for handling a disturbance when the disturbance is applied to prevent the control means from being electrically and/or mechanically damaged.

The automatic antenna extraction and retraction apparatus according to the present invention has advantages of having a high speech quality, and preventing harm to a user due to electromagnetic wave by ensuring that an antenna is always fully extracted while a user talks over the wireless telephone, having a minimized size so as to be applicable to any conventional wireless telephone, being able to effectively save a battery therein by intermittently supplying electric power to a driving motor, being convenient to use because it detects the opening and closing operation of a front flip cover and automatically extracts and retracts an antenna, and having a good characteristic of durability because it is designed so as to absorb external shock.

DETAILED DESCRIPTION OF THE PREFERRED EMBODIMENT

Hereafter, a preferred first embodiment of an automatic antenna extraction/retraction apparatus according to the present invention will be described with reference to the accompanying drawings.

Figure 1:
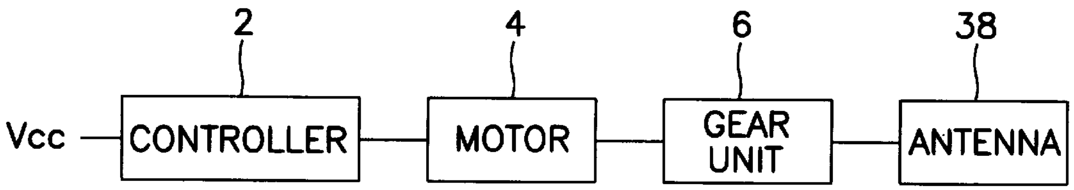
FIG. 1 is a block diagram showing a whole conceptional constitution of an automatic antenna extraction and retraction apparatus according to one embodiment of the present invention.
Figure 12:
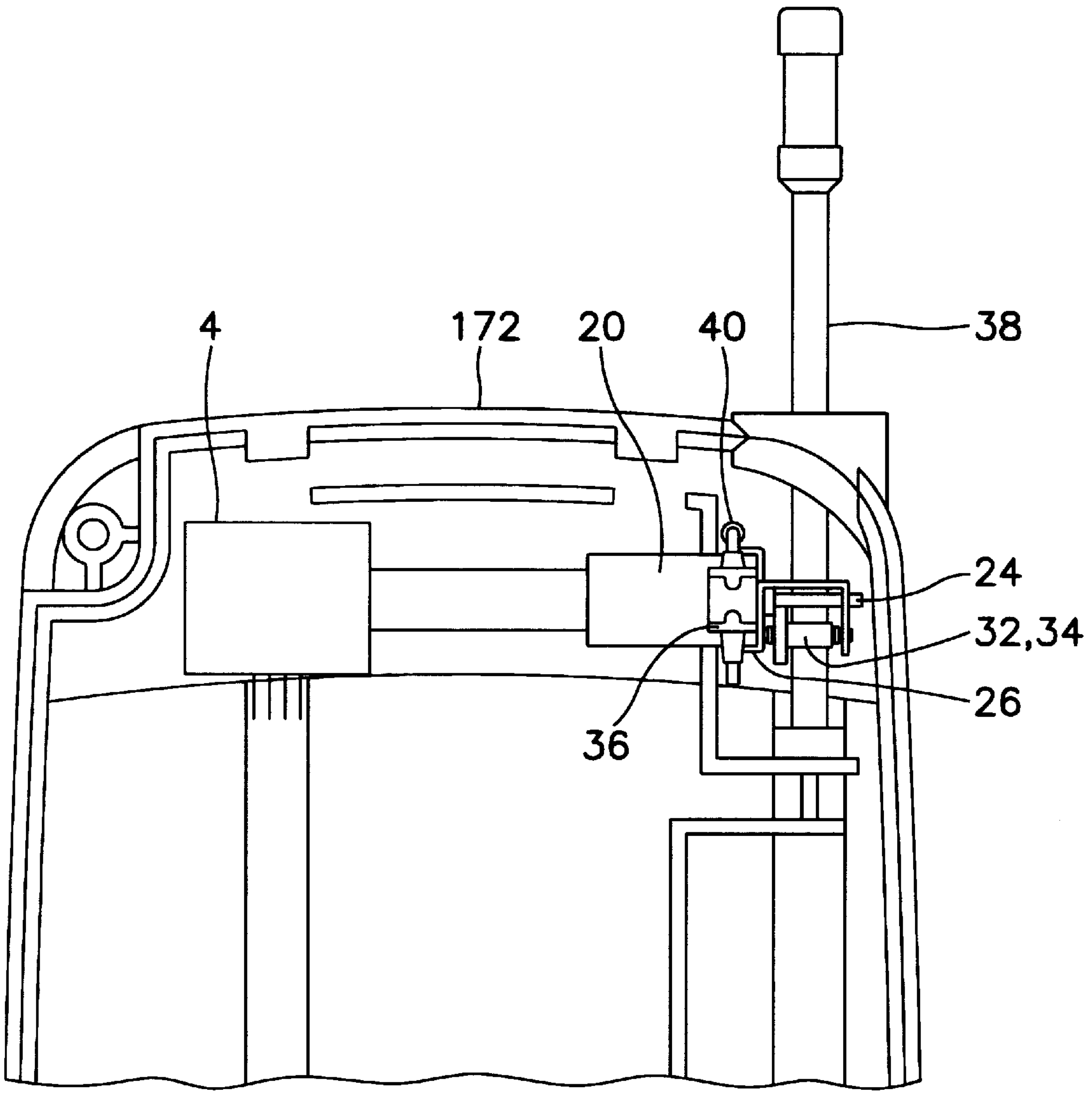
FIG. 12 is a layout drawing showing a figure where the automatic antenna extraction/retraction apparatus according to the present invention is substantially mounted on an antenna housing.

FIG. 1 is a block diagram showing a whole conceptional constitution of an automatic antenna extraction and retraction apparatus according to one embodiment of the present invention. The apparatus has a gear unit 6 for extracting or retracting an antenna 38 from or to an antenna housing 172 (FIG. 12), a motor part 4 for transferring a rotating force to the gear unit 6, and a controlling part 2 for providing driving signals to the motor part 4 after receiving a driving power from a power source (Vcc), for controlling motor rotating direction, and for handling troubles which may occur while operating the antenna.

Figure 15:
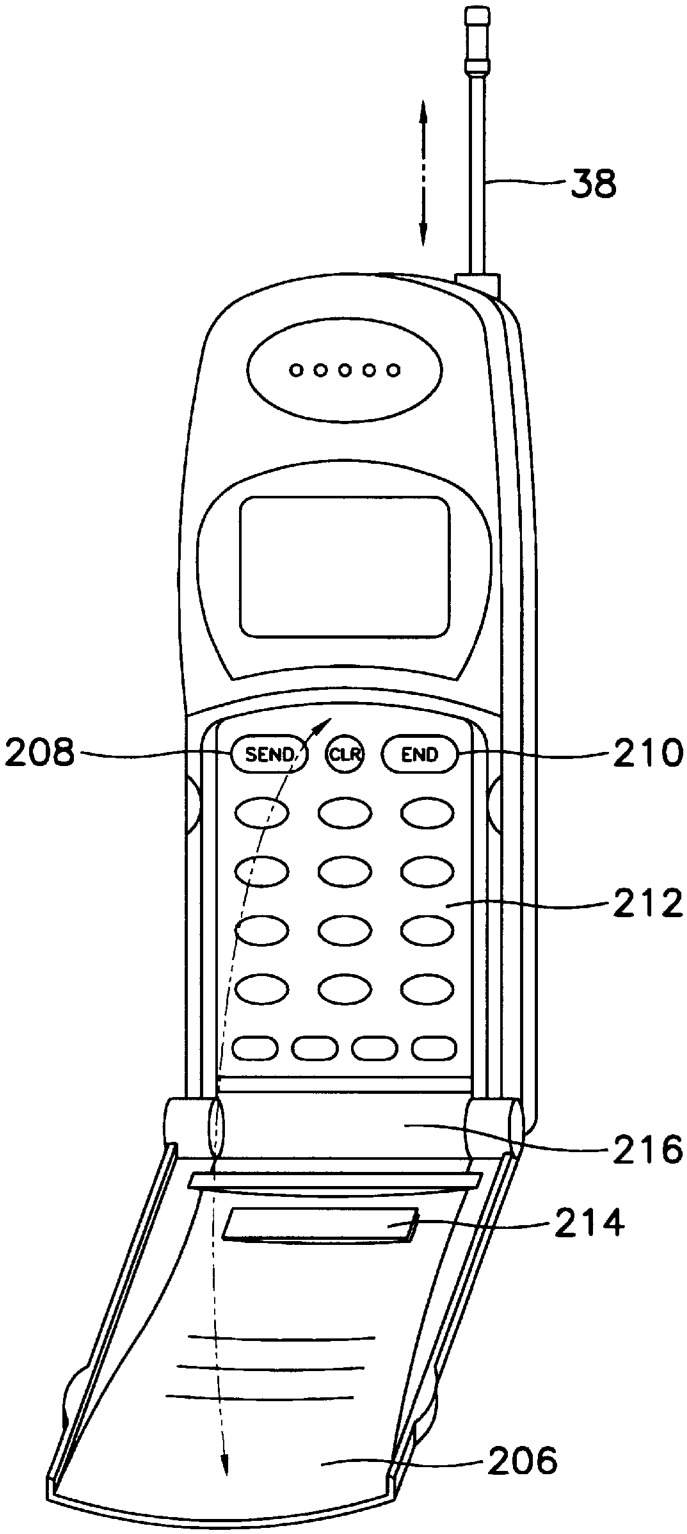
FIG. 15 is a view showing an external view of a conventional wireless telephone to which the apparatus of the present invention may be applied.

Today, some conventional wireless telephones, as shown in FIG. 15, include a "SEND" key or a "TALK" key, and an "END" key or an "OFF" key, on an operating panel 212 to order communication-start and communication-end, respectively, and some others further include a front flip cover 206 thereon for covering the operating panel 212. For convenience in usage, the automatic antenna extraction/retraction apparatus according to the present invention preferentially adopts such a method of automatically recognizing opening and/or closing of the front flip cover 206 as an antenna driving signal and thereby moving the antenna, or for applicability in a wireless telephone without the front flip cover, adopts such a method of a signal from the "SEND" key 208 and/or "END" key 210 as an antenna driving signal.

Figure 2:
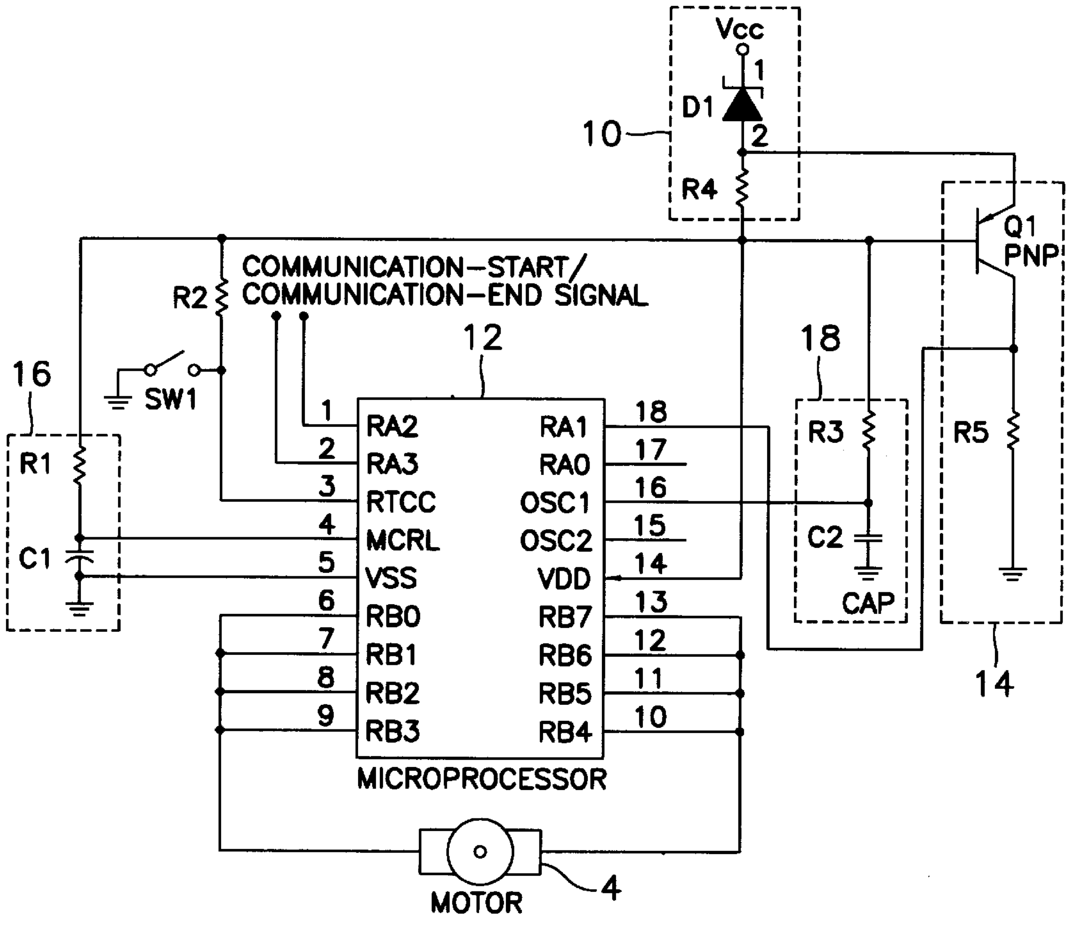
FIG. 2 is a circuit of a controlling means shown in FIG. 1.

As shown in FIG. 2, which shows an embodiment of a controlling part shown in FIG. 1, the controlling part 2 comprises an electric power source portion 10, a microprocessor 12, an over current detecting portion 14, a resetting portion 16 and a clock signal portion 18.

The electric power source portion 10 comprises a power source Vcc, a zener diode D1 connected to the power source Vcc for generating a constant voltage and a resistor R4 connected to the zener diode D1, in order to provide the microprocessor 12 with necessary electric energy for driving and controlling the motor part 4.

The microprocessor 12 is connected to the electric power source portion 10, the over current detecting portion 14, the resetting portion 16 and the clock signal portion 18, and has an input terminal RTCC for a switching signal of a lead switch SW1 or 216 in FIG. 15 magnetically coupled with a magnet 214 embedded in the front flip cover 206 of a wireless telephone, or in a wireless telephone without a front flip cover, has auxiliary terminals RA2 and RA3 for receiving a communication-start signal and a communication-end signal, respectively. The microprocessor 12 implements a built-in program to control an automatic antenna extraction/retraction operation. Detailed description for implementation of the program will be given with a description of the flow-chart in the FIG. 3.

The over current detecting portion 14 has a transistor Q1 and a resistor R5 serially connected thereto. As for the transistor Q1, a collector and a base thereof are connected to terminals of the resistor R4, respectively, and an emitter is connected to the microprocessor 12. The resistor R5 is grounded by one terminal thereof, and is commonly connected to both the emitter of the transistor Q1 and the microprocessor 12 by the other terminal thereof. If a problem occurs such as a user grasps the antenna during movement of the antenna or an external object disturbs the motor operation of the antenna, the motor part 4 is overloaded and is overly supplied with current to generate a larger torque, and thereby a high voltage drop arises in the resistor R4. At the same time, the emitter current of the transistor Q1 supplied to the microprocessor 12 is also increased, and as a result, the microprocessor 12 obtains information of whether the motor part 4 is overloaded or not by finding out that the current is above a predetermined value.

The resetting portion 16 has a resistor R1 and a capacitor C1, wherein the resistor R1 is connected to an output terminal of the electric power source portion 10 and both terminals of the capacitor C1 are connected to the microprocessor 12, and reset the microprocessor 12 when necessary.

The clock signal portion 18 has a resistor R3 in which one terminal thereof is connected to the resistor R4 and the other terminal thereof is connected to the microprocessor 12, a capacitor C2 in which one terminal thereof is connected to the resistor R3 and the other terminal thereof is grounded, and generates clock signals necessitated by the microprocessor 12.

The control circuit 2 can be minimized by arranging elements on both sides of an ultra-thin type printed circuit board and thereby, simply mounting the control circuit 2 in a reception space provided in an upper portion of antenna housing 172 of a conventional wireless telephone. In addition, making the control circuit 2 a digital circuit with a microprocessor of a key device can reduce battery loss, and intermittently supplying a motor driving signal to the motor part 4 by the microprocessor 12 at set intervals, for example, every few milliseconds or so, can also decrease the battery loss, thereby avoiding the need for frequent changing or charging of the battery.

Figure 3:
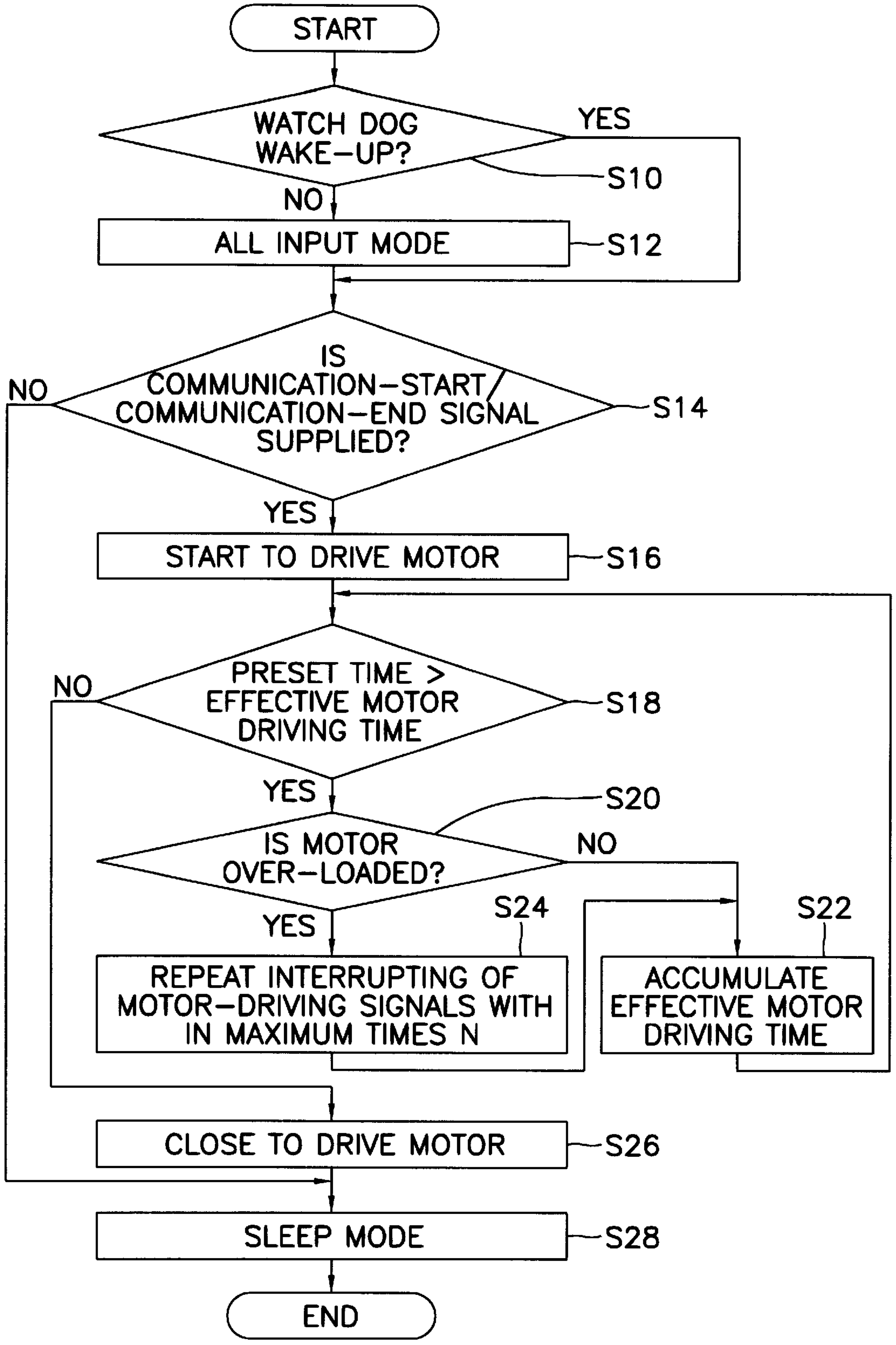
FIG. 3 is a flow-chart showing a control method for automatic antenna extraction/retraction implemented by a controlling means shown in FIG. 1.

FIG. 3 is a flow-chart showing an implementation order of the control method for automatic antenna extraction/retraction performed by the controlling means 2 shown in FIG. 1. With reference to accompanying FIGS. 2 and 3, explanation of the control method by the controller 2 will be described.

The implementation of a built-in program in the microprocessor 12 is started by supplying a power or a wake-up signal from a watchdog therein (step S10). After supplying power, in order to reduce loss of battery, all ports of the microprocessor 12 are set to an input mode (step S12).

During the input mode or after receiving the wake-up signal from the watchdog, the microprocessor 12 obtains communication-start or communication-end information through input terminal RTCC from ON/OFF switching signal of a lead switch SW1 which is switched in correspondence to an opening/closing operation of the front flip cover 206. This information is concerned with motor starting or stopping, and rotation direction of the motor. Basing on the obtained information, a decision for whether an antenna should be extracted or retracted from or into an antenna housing 172 is made. In a case of a wireless telephone which does not adopt the front flip cover, "SEND" key 208 and "END" key 210, which indicate communication-start or communication-end, may be utilized as an antenna driving signal source (step S14).

Next, with the obtained motor driving information, an antenna extraction command or an antenna retraction command is ordered, and the microprocessor 12 supplies the motor driving signal of a first polarity or of an opposite polarity to the first polarity to the motor part 4 through output terminals RB0–RB7 of the microprocessor 12 during a preset time "Tset" required for fully extracting or retracting the antenna, in order to drive the motor (step S16).

Here, the preset time "Tset" is an experimental value which is variable according to driving conditions such as antenna length, a reduction gear ratio and motor rotation velocity. In order to decrease the loss of battery, supplying and interrupting of the motor driving signal is continually repeated at a predetermined time "Tint". The times "Tset" and "Tint" are variable in the built-in program of the microprocessor 12.

While motor driving, an effective driving time of the motor is accumulated (step S22), and this accumulated motor driving time "Tdrv" is compared with the preset time "Tset" (step S18).

When the above comparison determines that the motor driving time "Tdrv" is smaller than the preset time "Tset", which means a state that the antenna is not fully extracted or retracted, an overload check for the motor due to an external disturbing force is implemented (step S20). At this time, the motor overload check is, as described above, performed by checking the output signal from the over current detecting portion 14.

When an over-current condition is detected, the operation of interrupting for a predetermined time "Tdly" and continuing power supplying to the motor 20 is repeated within a predetermined maximum number of times "N" (step S24). This repetition of power supplying and interrupting is performed to prevent electrical damage which may arise to the motor part 4 and/or the controlling part 2 by continued power supplying to the motor part 4 while the motor part 4 is overloaded. The predetermined time "Tdly" and the predetermined maximum number of times "N" are also changeable in the program. When an overload to the motor part 4 is detected even after power supplying and interrupting the maximum number of times "N", the control circuit 2 controls the antenna 38 to automatically retract the antenna into an antenna housing, and then ends supplying of a power, or motor driving signal, to the motor part 4. In other words, in order to ensure durability of the apparatus and stability of operation, when a resisting force, which is generated and transferred to the motor part 4 through the antenna 38 when the antenna 38 is grabbed by a user's hand or blocked by an obstacle, is detected by the control circuit 2, the control circuit 2 repeats an operation of driving and stopping of the motor part 4 within the predetermined maximum number of times N, but when normal moving of the antenna is continually disturbed in spite of the above repeated attempts, the antenna is automatically retracted into an antenna housing, and power supplying to the motor is ended to prevent the motor, the control circuit and/or the gear unit from being electrically and/or mechanically damaged.

From the check in the step 18 when it is known that the motor driving time "Tdrv" becomes the preset time "Tset", which means that the antenna is entirely extracted or retracted, power supplying to the motor should be closed to end antenna driving (step S26).

From the end of antenna driving until an input of the antenna extracting/retracting command, the microprocessor 12 is set into a sleep mode to save the power of a battery (step S28). While the microprocessor 12 is in the sleep mode, the microprocessor 12 can avoid an unnecessary power loss since only a portion of the microprocessor 12 which takes a role of obtaining information about driving of the antenna is alert.

Next, a description of an antenna driving mechanism of an automatic antenna extraction/retraction apparatus according to a first embodiment of the present invention will be given.

Figure 10:
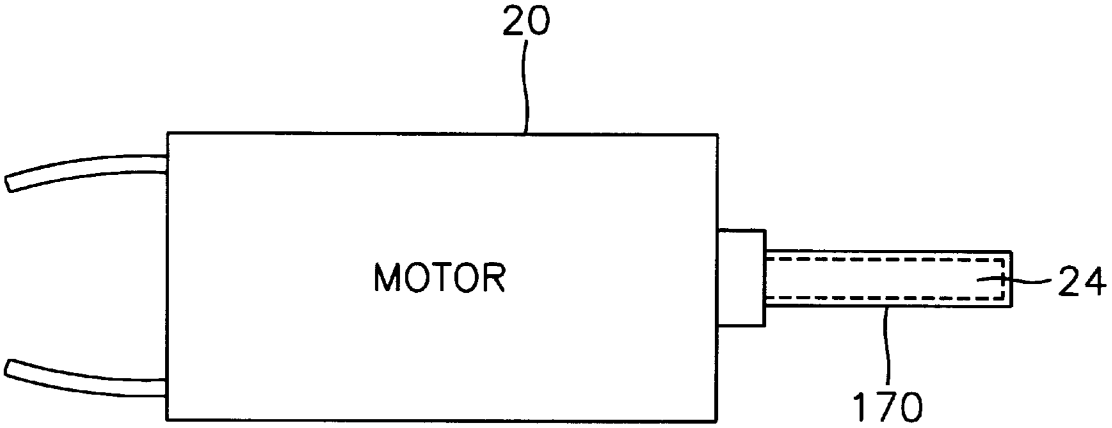
FIG. 10 is a side view of a motor shown in FIG. 4A.

A motor 20, comprising a motor shaft 24, rotates the motor shaft 24 clockwise or counterclockwise corresponding to a polarity of the driving signal supplied from the microprocessor 12. As shown in FIG. 10, the motor shaft 24 is enveloped on its outer surface with an outer cover 170 made of rubber material to raise a frictional force and an elastic force thereof.

The motor 20 advisably adopts a coreless and small type DC motor with a small diameter, for example, 4 mm to 6 mm.

A gear unit 6, detachably and tightly coupled with the motor 20, transfers a rotating force from the motor shaft 24 to the antenna 38, and thereby extracts or retracts the antenna 38 from or into the antenna housing 172. Detailed description of the elements of the gear unit 6 will be disclosed.

A gear box 26, as shown in FIGS. 4A, 4B and 5A to 5C, includes a base plate 112 whose dimensions are enough to receive a top of the motor 20 on which the motor shaft 24 is mounted. On a surface of the base plate 112 coupling elements for example, coupling projections 100, 102 and 104, are formed integrally to tightly couple the gear box 26 with the motor 20. For bracketing, gear-shaft brackets 106 and 108 are formed, and extend from a position of the base plate 112 in a direction opposite to the projected direction of the coupling projections 100, 102 and 104, and are bent to be parallel with the base plate 112. In a center of the base plate 112, a hole 114 is formed for penetration by the motor shaft 24, and in the base plate 112 and the brackets 106 and 108, two pairs of holes 116/118 and 120/122 are formed, respectively, wherein each pair of holes 116/118 and 120/122 are lined in the same axis. In addition, the gear box 26 further comprises a fixing bracket 110 which is extended in a radial direction from one edge position and bent in the projection direction of the coupling projections 100, 102, and 104, wherein fixing grooves 124 and 124' are formed on sides of the bent portion, respectively.

Figure 6:
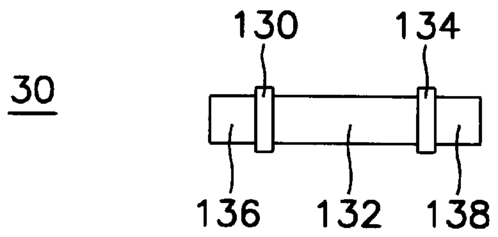
FIG. 6 is a side view of a gear shaft, which is one element of the gear unit shown in FIG. 4A.

A pair of gear shafts which have the same structure are provided in the gear unit 6. As shown in FIG. 6, each of gear shafts 28 and 30 has both end portions 136 and 138 inserted into a pair of holes 116 and 118 respectively and the other pair of holes 120 and 122 respectively, has a pair of hoops 130 and 134 for preventing the gear shafts 28 and 30 from breaking away from the gear box 26, and has a portion 132 around which gears 32 or 34 are tightly coupled.

Figure 7A:
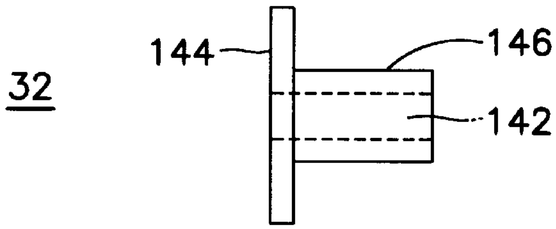
FIG. 7A is a side view of a gear, which is one element of the gear unit shown in FIG. 4A, according to the first embodiment of the present invention.
Figure 11A:
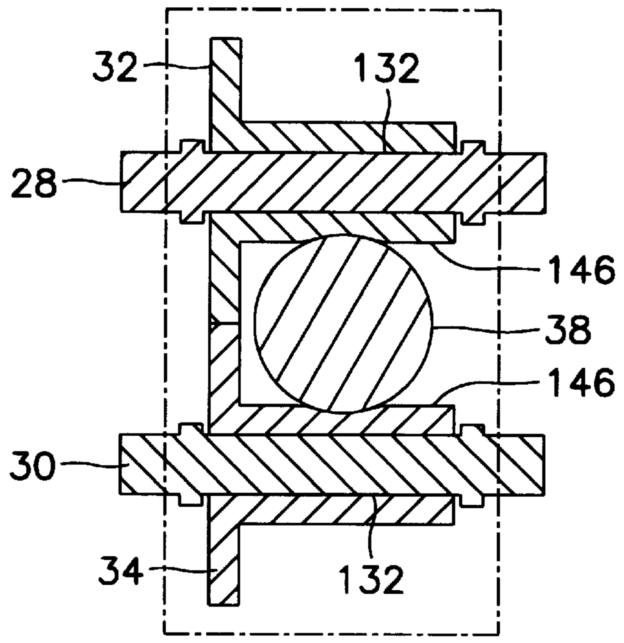
FIG. 11A is a simplified section view of portion "B" in FIG. 4A in case where the gear shown in FIG. 7A is adopted.
Figure 11B:
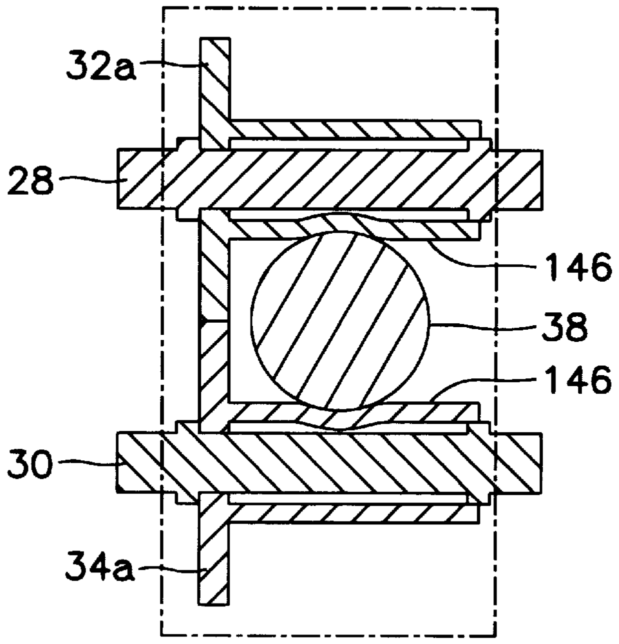
FIG. 11B is a simplified section view of portion "B" in the FIG. 4A in a case where the gear shown in FIG. 7B is adopted.

First gear 34 and second gear 32, as shown in FIG. 7*a,* are formed integrally with two portions: a gear contact portion 144 and an antenna contact portion 146. The gear contact portion 144 of the first gear 34, whose diameter is larger than that of the antenna contact portion 146, is geared with the motor shaft 24. The diameter difference between the portion 144 and the portion 146 should be, as shown in FIG. 11*a,* a value such that when both the gear contact portions 144 of the one pair of the gears 32 and 34 are tightly contacted and rotated, the antenna 38 can be tightly received between the antenna contact portions 146 of the first gear 34 and the second gear 32 to have no loss in transmission of driving force. On the other hand, in order to obtain a larger torque which applies a proper reduction ratio for the motor shaft 24, the diameter of the gear contact portion 144 of the first gear 34 has a value which is larger than that of the motor shaft 24 by a predetermined multiple. In the centers of the gears 32 and 34, a penetration hole 142 is formed along the axes thereof. The gears 32 and 34, as shown in FIG. 11A, are tightly coupled with the peripheral surfaces 132 of the gear shafts 28 and 30, respectively.

Figure 7B:
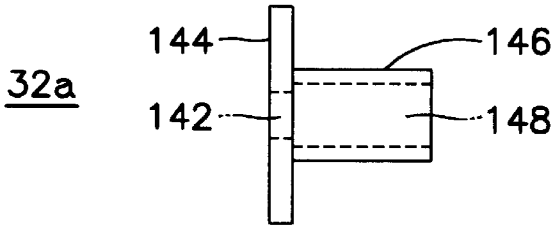
FIG. 7B is a side view of a gear, which is one element of the gear unit shown in FIG. 4A, according to a second embodiment of the present invention.

On the other hand, there is an other embodiment of a gear such that, as shown in FIG. 7B, a penetration hole 148 formed along an axis of the antenna contact portion 146 has the same diameter as that of the hoop 134 of the gear shaft 30, and a cavity is provided between the gear coupling portion 132 of gear shaft 30 and an inner peripheral surface of the antenna contact portion 146 of gear 32*a.* Adoption of this gear 32*a,* as shown in FIG. 11A, makes it possible to move an antenna more stably and to absorb an impact or vibration more effectively because a contact area of the antenna contact portion 146 which directly makes contact with the antenna 38 is wider.

Figure 7C:
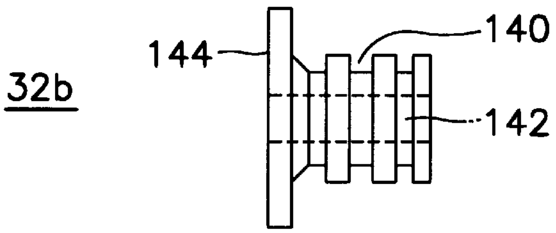
FIG. 7C is a side view of a gear, which is one element of the gear unit shown in FIG. 4A, according to a third embodiment of the present invention.

There is a third embodiment of a gear, as shown in FIG. 7C, whose surface of the antenna contact portion 140 of a gear 32*b* has a shape of prominence and depression. The prominence and depression surface has an advantage in preventing the antenna 38 from running-off a normal movement track.

It is desirable that the above gears be made of an elastic material, for example, rubber, to increase a frictional force and absorb impact or vibration, but the above gears need not be limited to rubber.

Long-term usage of an antenna driving apparatus may cause a crooked form of the antenna due to an external force, which may disturb normal driving of the antenna. In addition, vibration due to motor driving or external impact transferred to the antenna 38 may frequently occur. Considering these factors, there is a need for a shock-absorbing means which can reduce and absorb the external force or vibration applied to the motor 20 and the gear box 26.

As for this, to shock-absorb the external force transferred to the motor 20 and the gear unit 6 through the antenna 38, and to absorb the vibration generated by motor driving and to fix the motor 20 and the gear unit 6 to the antenna housing 172, a fixing means comprising a shock-absorbing element 36 and fixing pin 40 as well as the fixing bracket 110 is further provided.

Figure 4A:
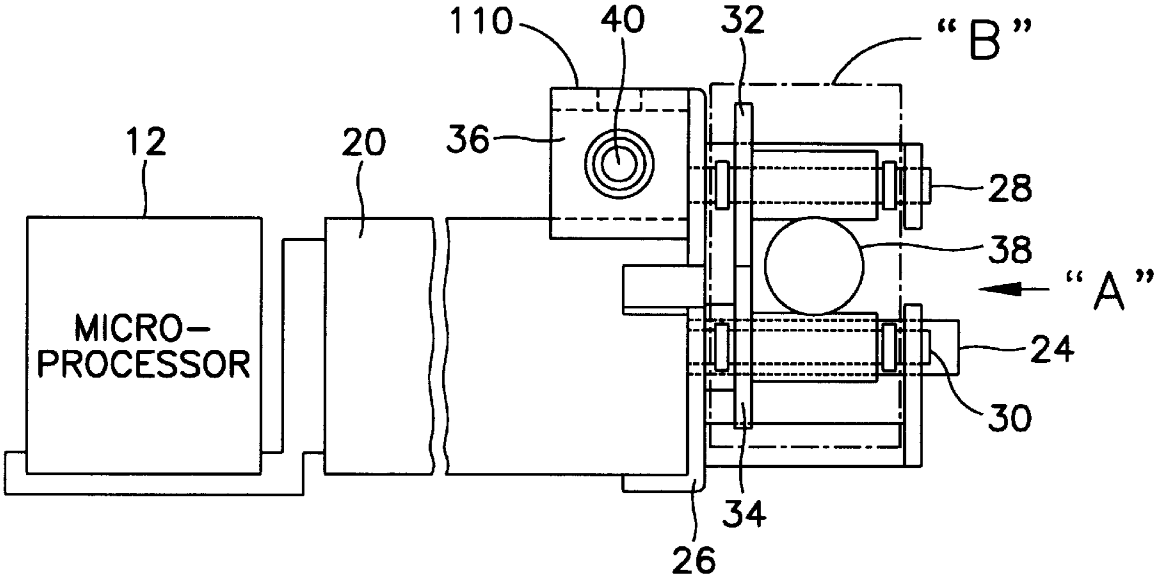
FIG. 4A is a plane view of an automatic antenna extraction/retraction apparatus for explaining an antenna moving mechanism according to a first embodiment of the present invention.
Figure 4B:
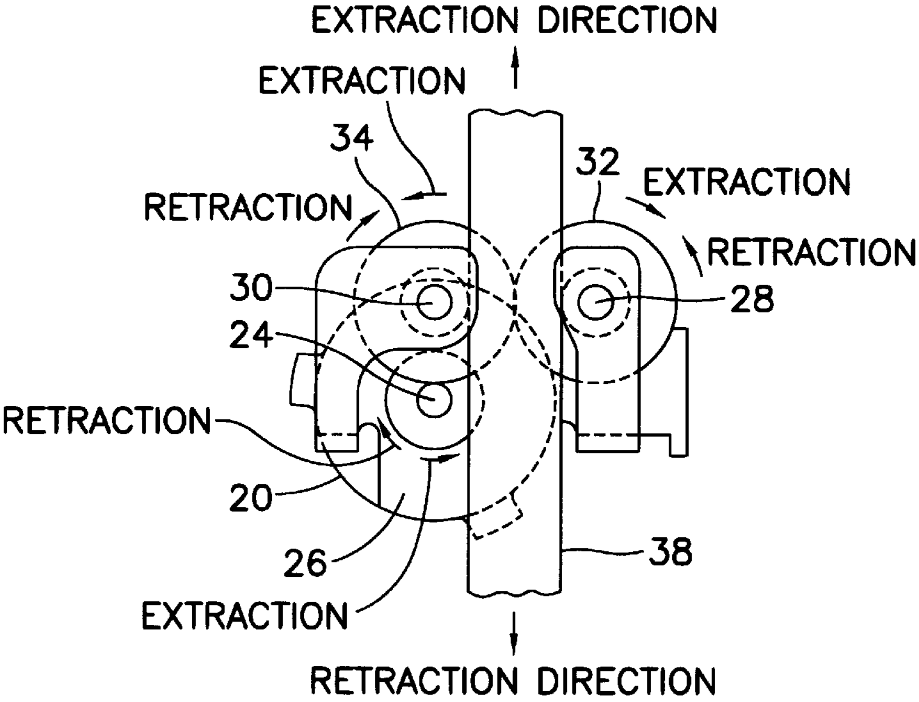
FIG. 4B is a side view of the apparatus viewed from direction "A" in FIG. 4A.
Figure 5A:
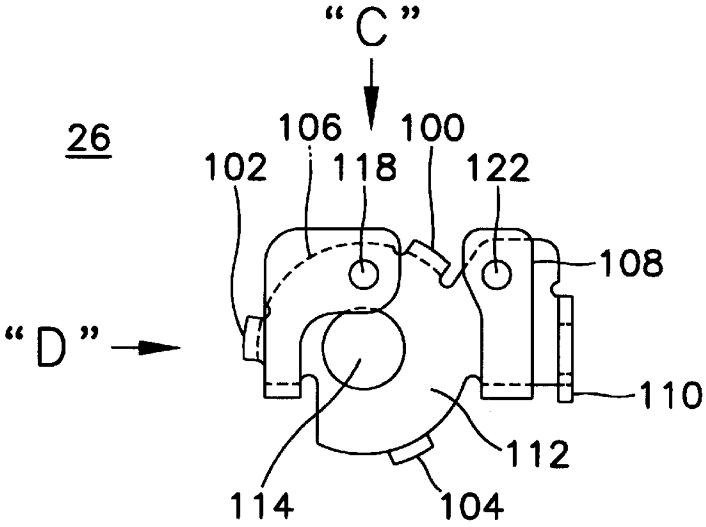
FIG. 5A is a plane view of a gear box, which is one element of a gear unit shown in FIG. 4A, viewed from direction "A" in FIG. 4A.
Figure 5B:
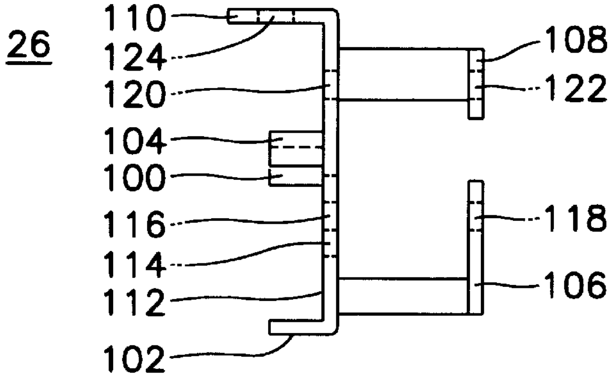
FIG. 5B is a side view of the gear box shown in FIG. 4A view from direction "C" in FIG. 5A.
Figure 5C:
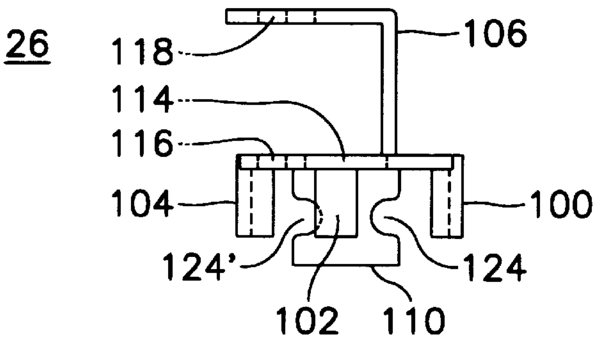
FIG. 5C is a bottom view of the gear box shown in FIG. 4A viewed from direction "D" in FIG. 5A.
Figure 8A:
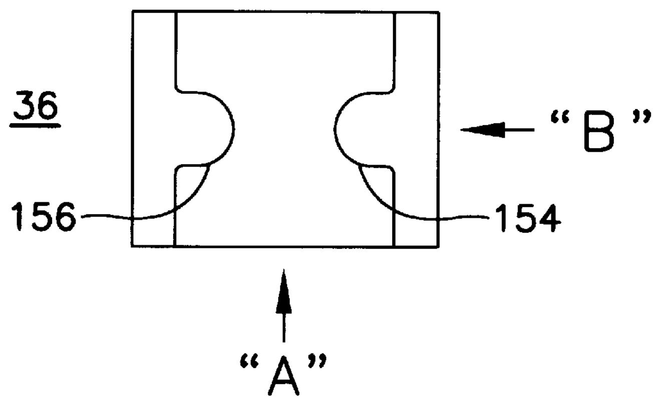
FIG. 8A is a plane view of a shock absorbing part which is one element of the gear unit shown in FIG. 4A.
Figure 8B:
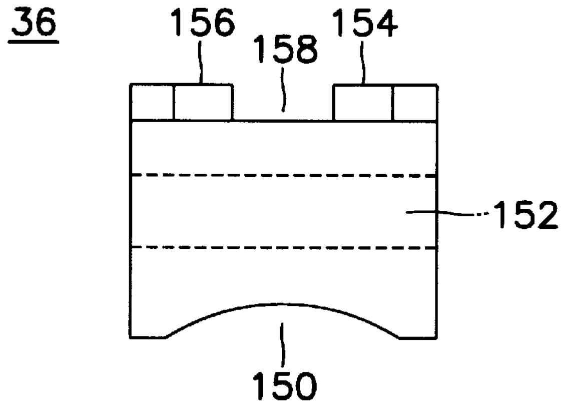
FIG. 8B is a side view of the shock absorbing part viewed from direction "A" in FIG. 8A.
Figure 8C:
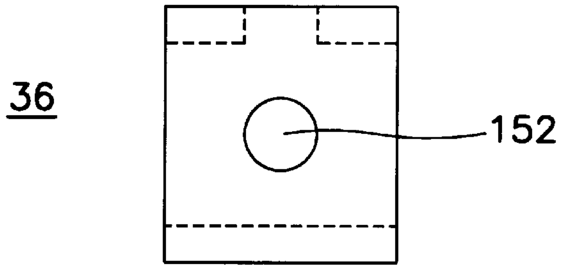
FIG. 8C is a side view of the shock absorbing part viewed from direction "B" in FIG. 8A.

The shock-absorbing element 36, as shown in FIG. 4A, is tightly inserted between a portion of an upper peripheral surface thereof and under the fixing bracket 110 in the gear box 26. For close adherence, the shock-absorbing element 36, as shown in FIGS. 8A to 8C, has such a shape of a circle at a bottom 150 thereof, protrusion elements 154 and 156 are tightly fitted into the fixing grooves 124 and 124', and a penetration hole 152 is formed in the center thereof. It is desirable that the shock-absorbing element 36, considering its function, be made of an elastic material such as rubber so as to absorb and weaken an external shock transferred through an antenna 38 or to absorb motor vibration.

Figure 9:
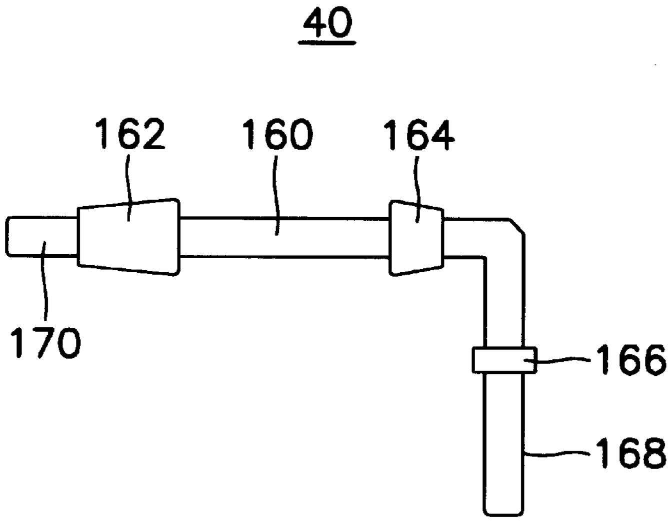
FIG. 9 is a side view of the fixing pin, which is one element of the gear unit shown in FIG. 4A.

As shown in FIG. 9, the fixing pin 40 has a shape of an upper right corner of a rectangle, comprising both end coupling portions 168 and 170 inserted into both coupling grooves (not shown) provided at a predetermined positions of the antenna housing 172, respectively, a portion 160 tightly contacted to the surface of the penetration hole 152 formed in the shock-absorbing element 36, and hoops 162, 164 and 166 for tightly coupling the fixing pin 40 with the shock-absorbing element 36.

Using such gears 32 and 34 and the shock-absorbing element 36 having the shape and material described above makes it possible to prevent the antenna 38 from being abnormally driven due to a metamorphosis or a bending of the antenna oriented perpendicular to a straight moving axis of the antenna, to flexibly absorb an external shock from transferring to the motor 20 and the gear box 26 and thereby extract or retract the antenna always in a best condition, and to considerably reduce noise and vibration generated from a driving motor.

In the gear unit 6 as described above, as shown in FIG. 4B, the torque of the motor shaft 24 is transferred into a larger torque through the first gear 34 at a pertinent reduction ratio. At this time, the first gear 34 is rotated in a direction opposite to the rotational direction of the motor shaft 24, and after receiving torque from the first gear 34, the second gear 32 is rotated in a direction opposite to the rotational direction of the first gear 34. Thus, the antenna 38 is vertically extracted or retracted by the engaged rotation of one pair of the gears 32 and 34 whose rotations are opposite to each other.

Next, an automatic antenna extraction and retraction apparatus according to the other embodiments of the present invention will be described.

Figure 13A:
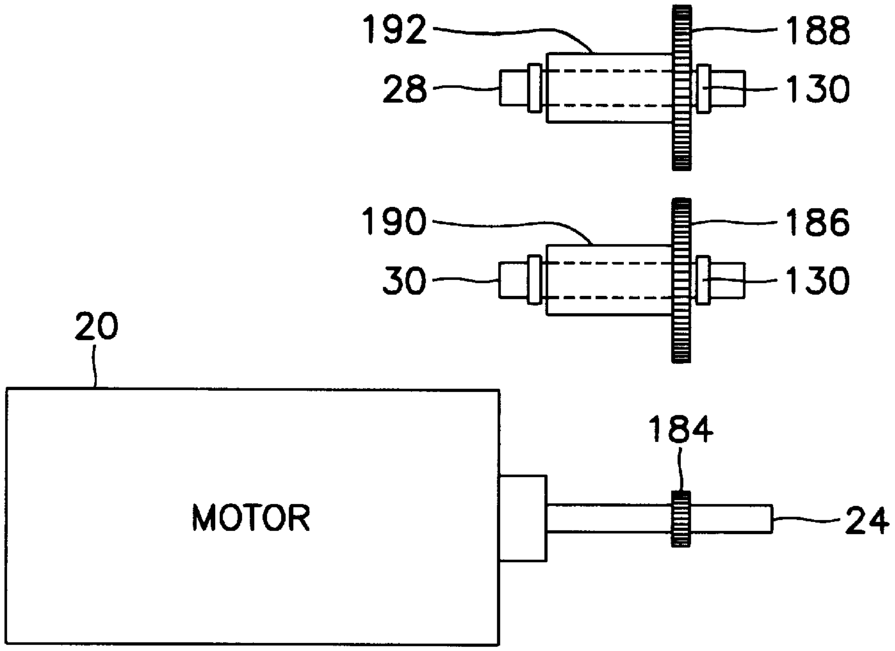
FIG. 13A shows some changed elements in a case where a saw gearing mechanism according to a second embodiment of the present invention is adopted.
Figure 13B:
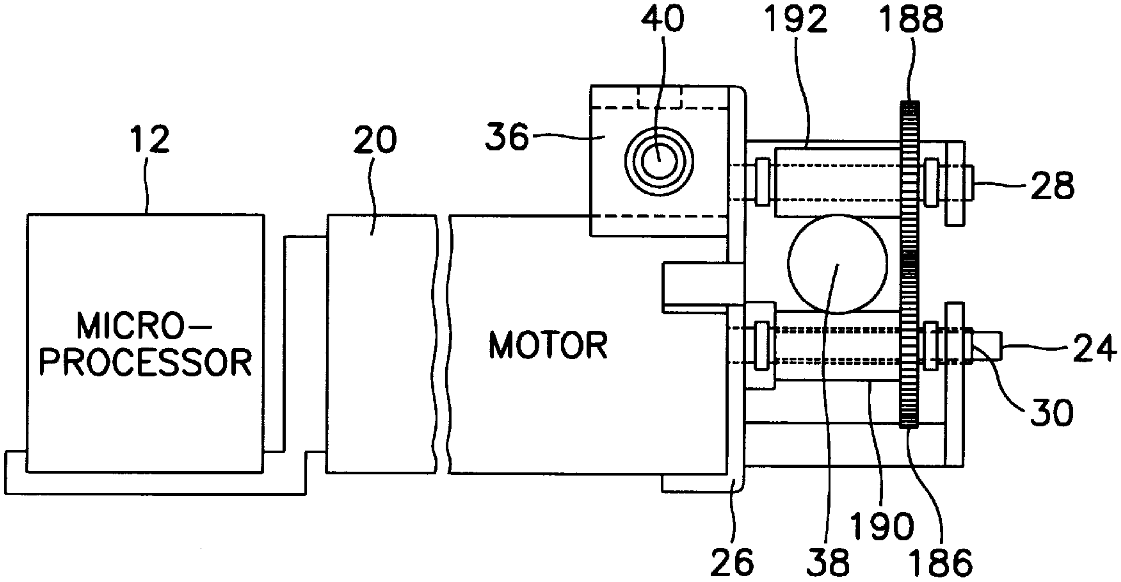
FIG. 13B is a plane view of the automatic antenna extraction/retraction apparatus in a case where changed elements are applied.

FIGS. 13A and 13B show an automatic antenna extraction and retraction apparatus according to a second embodiment of the present invention in a case where a saw gear type gear is adopted.

Here, a concise description will be given only for elements different from the elements in the above described first embodiment. As shown in the above drawings, a first saw gear 184 is coupled to a predetermined position of the motor shaft 24, and a pair of saw gears 186 and 188 are coupled to inner positions of the first hoops 130 of the gear shafts 28 and 30, respectively. Each of the second saw gear 186 and the third saw gear 188 has an outer diameter that is a predetermined multiple as larger than that of the first saw gear 184 in order to create a larger torque with a reduction ratio with respect to the first gear 184. A pair of gears 190 and 192 have a cylindrical shape with a penetration hole formed along an axes thereof, into which a portion 132 of the gear shafts 28 or 30 is inserted to be tightly coupled with the gears 190 and 192. It is advisable that the gears 190 and 192 be made of an elastic material such as rubber. An outer diameter of the gears 190 and 192 is equal to that of the antenna contact portion 146 of the gear 32. When both the first gear shaft 30 coupled with the second saw gear 186 and the first gear 190, and the second gear shaft 28 coupled with the second saw gear 188 and the first gear are mounted on the gear box 26, the saw gear 186 of the first gear shaft 30 is engaged with the saw gear 188 of the second gear shaft 28, and both the first gear 190 and the second gear 192 are tightly engaged with the antenna 38.

Figure 14A:
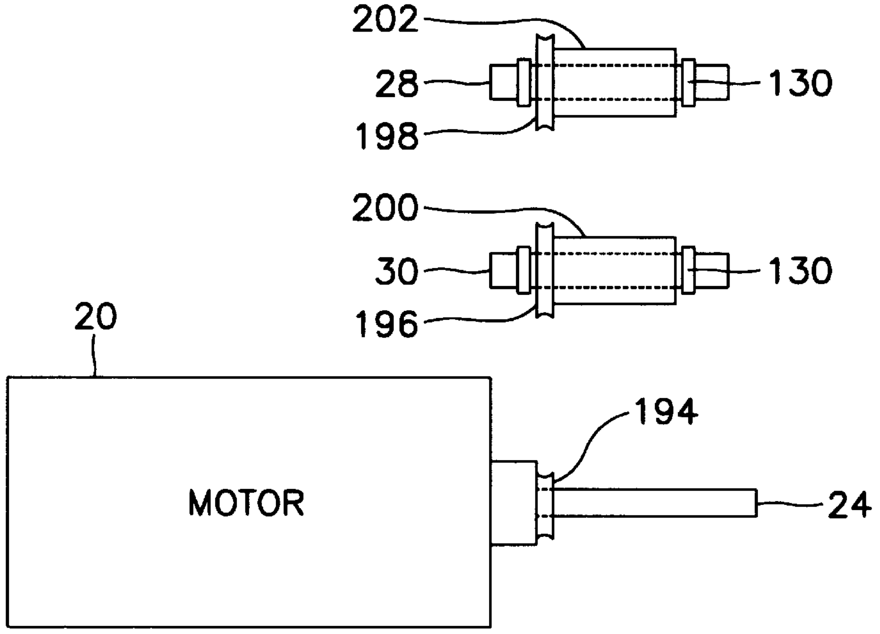
FIG. 14A shows some changed elements in a case where a belt gearing mechanism according to a third embodiment of the present invention is adopted.
Figure 14B:
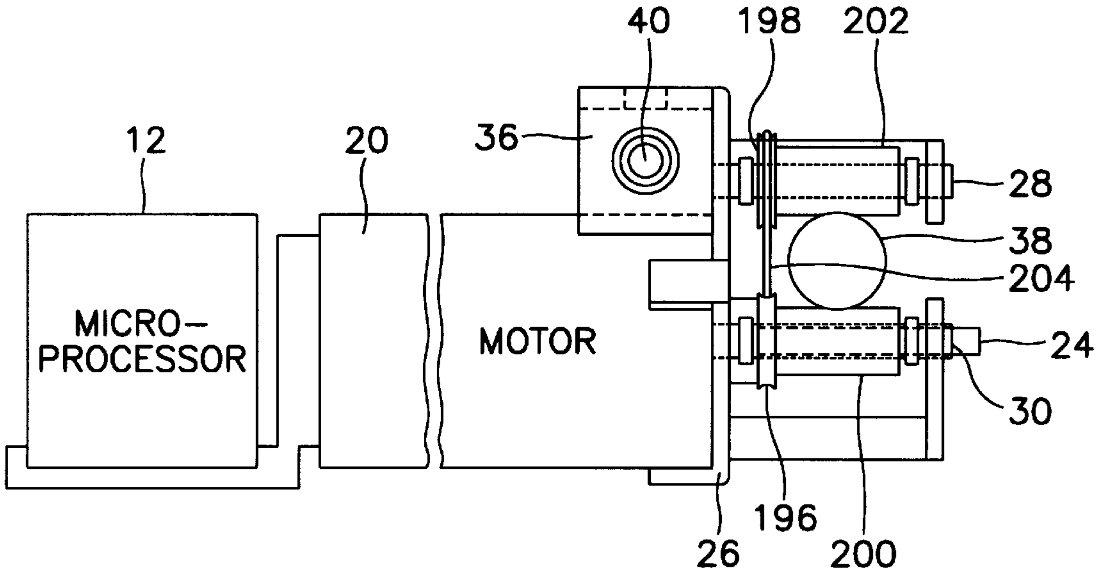
FIG. 14B is a plane view of the automatic antenna extraction/retraction apparatus in a case where changed elements are applied.
Figure 14C:
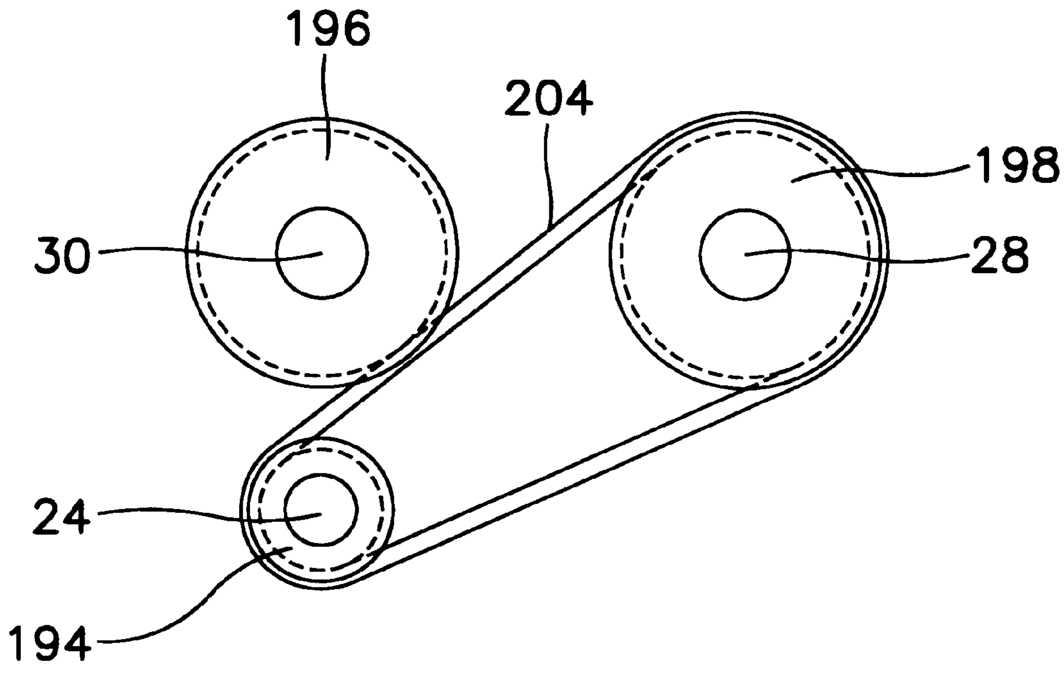
FIG. 14C is a side view where the belt is applied to both a pair of gears and a motor shaft.

FIGS. 14A to 14C show an automatic antenna extraction and retraction apparatus according to a third embodiment of the present invention in a case where a belt driving type gear is adopted.

Here, a concise description will be given only for elements different from the elements in the above described first embodiment. As shown in above drawings, a driving force is transferred through a belt 204 in this type. A first belt pulley 194 is provided at a predetermined position of the motor shaft 24, and a second belt pulley 196 and a third belt pulley 198 are provided to just inner positions of the hoops 130 of the gear shafts 28 and 30, respectively. Each of the belt pulleys 196 and 198 has a diameter that is a predetermined times larger than that of the first belt pulley 194 in order to get a larger torque with a reduction ratio with respect to the first belt pulley 194. A first gear 200 and a second gear 202 have a cylindrical shape with a penetration hole formed along an axes thereof, into which a portion 132 of the gear shafts 28 or 30 is inserted to be tightly coupled with the gears 200 and 202. Each outer diameter of the gears 200 and 202 is equal to that of the antenna contact portion 146 of the gear 32. It is advisable that the gears 200 and 202 be made of elastic material such as rubber. When both the first gear shaft 30 and the second gear shaft 28 are mounted on the gear box 26, both the first gear 200 and the second gear 202 are tightly engaged with the antenna 38. As shown in FIG. 14C, the belt 204 is wound around to the three belt pulleys 194, 196 and 198 so that the first gear shaft 30 can be rotated in a direction opposite to the rotational direction of the motor shaft 24, and at the same time, so that the second gear shaft 28 can be rotated in the same direction as the rotational direction of the motor shaft 24, and the antenna 38 is vertically moved by the rotating force generated from the motor 20 and transferred to the first gear shaft 30 and the second gear shaft 28 by the belt 204.

While the present invention has been particularly shown and described with reference to particular embodiments thereof, it is not limited only to a portable telephone or a wireless telephone, but rather applicable to any other radio transmitter/receiver or portable electronic product which has an antenna. It will be understood by those skilled in the art that various changes in form and details may be effected therein without departing from the spirit and scope of the invention defined by the appended claims.

What is claimed is:

1. A method for automatically extracting and retracting a slide-embedded type of an antenna, comprising the steps of:

i) obtaining information for extraction and retraction of said antenna, and deciding whether to extract or retract said antenna based on the obtained information;

ii) supplying a motor-driving signal to a motor during a first preset time to extract or retract fully said antenna from or into an antenna housing, based on the decision in said step i);

iii) comparing an effective motor-driving time with said first preset time;

iv) checking whether said motor is loaded over a preset reference value when an amount of said effective motor-driving time is smaller than said first preset time;

v) interrupting supply of said motor-driving signal to said motor when a state that said motor is loaded over said preset reference value is checked; and vi) automatically retracting said antenna into said antenna housing when said state where said motor is loaded over said preset reference value is detected while extracting said antenna from said antenna housing.

2. The method as claimed in claim 1, wherein said motor-driving signal is intermittently supplied to said motor by a predetermined time interval, in said step ii).

3. The method as claimed in claim 1, wherein said interrupting step is repeatedly implemented within a preset maximum number of interruption, and a period for the interruption in said interrupting step lasts during a second preset time.

4. The method as claimed in claim 1, said method further comprising the step of closing the supply of said motor-driving signal to said motor when said effective motor-driving time becomes equal to said first preset time, based on a result of said comparing step.

5. A method for automatically extracting and retracting an antenna from and into an antenna housing in a wireless communication device, comprising the steps of:

i) obtaining information for extraction and retraction of said antenna from electric signals corresponding to communication-start operation and communication-end operation of said wireless communication device;

ii) based on said information, supplying a motor with a motor-driving signal to rotate said motor clockwise and counter-clockwise to drive said motor;

iii) in parallel with driving of said motor, accumulating an effective motor-driving time, and comparing said accumulated motor-driving time with a preset-time during which said antenna is fully extracted or retracted from or into said antenna housing in a case where there is no disturbance in driving of said motor, wherein both said accumulating and comparing operations are periodically repeated so long as said motor is driven;

iv) based on each of results of said repeated comparing operations, periodically checking whether said motor is loaded over a reference value when said effective motor-driving time is smaller than said preset-time;

v) when said motor is loaded over said reference value, repeating within a number of times an operation of interrupting said motor-driving signal so that said motor-driving signal is not supplied to said motor for a predetermined time until a state that said motor is loaded over said reference value is removed;

vi) based on each of said results of said repeated comparing operations, closing a supply of said motor-driving signal to said motor when said effective motor-driving time becomes equal to said preset-time; and vii) automatically retracting said antenna into said antenna housing when said state where said motor is loaded over said reference value is detected even after repeating said interrupting operation of said motor-driving signal while extracting said antenna from said antenna housing.

6. The method as claimed in claim 5, said method further comprising a step for setting a control means which controls driving of said motor to a sleep mode during an interval after extracting or retracting of said antenna from/into said antenna housing is finished until a next communication-start operation or a next communication-end operation occurs.

7. The method as claimed in claim 5, wherein said supplying said motor with said motor-driving signals is intermittently performed at a predetermined time interval.

8. The method as claimed in claim 5, wherein said checking for whether said motor is loaded over said reference value is performed by detecting whether a current supplied into a motor controlling means from a power source is larger than a predetermined value.

9. The method as claimed in claim 5, wherein said electric signals corresponding to communication-start operation and communication-end operation are electric switching signals transformed from one of the operations of opening and closing a front flip cover of said wireless communication device and electrical signals generated from the operations of keying a communication-start key and a communication-end key of said wireless communication device.

10. The apparatus as claimed in claim 1, said apparatus further comprising a fixing and absorbing means for tightly fixing an assembly of said motor and said gear unit to said antenna housing, and absorbing a vibration generated when said motor is driven and absorbing an external disturbing force transferred to said assembly through said antenna.

11. An apparatus for automatically extracting and retracting an antenna from/into an antenna housing of a communication device, said apparatus comprising:

i) a motor, including a motor shaft, for rotating said motor shaft clockwise or counterclockwise in correspondence to a supplied motor-driving signal to generate a rotating force;

ii) a control means for obtaining information for extraction and retraction of said antenna from electric signals corresponding to communication-start operation and communication-end operation of said wireless communication device, and, based on said information, supplying said motor with said motor-driving signals to rotate said motor clockwise and counter-clockwise until a preset-time elapses during which said antenna is fully extracted or retracted from or into said antenna housing in a case where there is no disturbance in the driving of said motor, wherein supplying of said motor-driving signal to said motor is intermittently performed at a predetermined time intervals, and while driving said antenna, the control means checks whether driving of said antenna is disturbed and automatically retracts the antenna when a disturbance is applied to said antenna when a preset time elapses;

iii) a gear unit, being integrally formed with said motor, for applying said antenna with said rotating force transferred from said motor shaft to extract/retract said antenna from/into said antenna housing; and iv) a fixing means for tightly fixing an assembly of said motor and said gear unit to said antenna housing.

12. The apparatus as claimed in claim 11, wherein said control means, in parallel with driving of said motor, accumulates an effective motor-driving time and compares said accumulated motor-driving time with said preset-time, wherein both said accumulating and comparing operations are periodically repeated so long as said motor is driven; based on each of said repeated comparisons, periodically checks whether said motor is loaded over a reference value when said effective motor-driving time is smaller than said preset-time; when said motor is loaded over said reference value, repeats within a maximum number of times N an operation of interrupting said motor-driving signal so that they are not supplied to said motor for a predetermined time until a state that said motor is loaded over said reference value is removed; and, based on each of said repeated comparisons, closes a supply of said motor-driving signal to said motor when said effective motor-driving time becomes equal to said preset-time.

13. The apparatus as claimed in claim 11, wherein said control means comprises:

a microprocessor for implementing a predetermined built-in program therein;

a resetting portion for resetting said microprocessor; an over current detecting portion for providing information to said microprocessor of whether said motor is loaded over a reference value;

a clock signal portion for supplying clock signals to said microprocessor; and a power source portion for providing a constant voltage to said microprocessor, said resetting portion, said over current detecting portion, and said clock signal portion.

14. The apparatus as claimed in claim 13, wherein:

said power source portion includes a zener diode connected to a power source and a first resistor connected to said zener diode;

said microprocessor is connected to said power source portion;

said resetting portion includes a second resistor and a first capacitor which are serially connected, wherein said second resistor is connected to said power source portion and both terminal of said first capacitor are connected to said microprocessor;

said over current detecting portion includes a transistor and a third resistor serially connected said transistor, wherein both a collector and a base of said transistor are connected to terminals of said first resistor, respectively, an emitter of said transistor is connected to said microprocessor, and said third resistor is grounded by a first terminal thereof and is commonly connected to both the emitter of said transistor and said microprocessor by a second terminal thereof; and said clock signal portion includes a fourth resistor and a second capacitor serially connected to said fourth resistor, wherein said fourth resistor is connected to said first resistor and said microprocessor by terminals thereof, respectively, and said second capacitor is grounded by one terminal thereof not connected to said fourth resistor.

15. The apparatus as claimed in claim 11, wherein said control means is set in a sleep mode for an interval after finishing the extracting or retracting of said antenna from/into said antenna housing till next said communication-start operation or next said communication-end operation occurs.

16. The apparatus as claimed in claim 11, wherein said gear unit comprises a gear box detachably and integrally coupled with said motor, wherein:

said motor shaft is received therein and said antenna penetrates therethrough;

a first gear part, mounted on said gear box, wherein said first gear is in parallel engaged with said motor shaft and cross engaged with said antenna with respect to an axis of said first gear, for shifting said rotating force from said motor shaft to both said antenna and a second gear part; and a second gear part, mounted on said gear box, wherein said second gear is in parallel engagement with said first gear part and cross engagement with said antenna with respect to an axis of said second gear, for shifting said rotating force from said first gear part to said antenna, wherein both said first gear part and said second gear part apply a geared rotating force to said antenna to linearly move said antenna.

17. The apparatus as claimed in claim 16, wherein said motor further comprises an outer cover, which is comprised of an elastic material and is applied to said motor shaft, for increasing a frictional force between said motor shaft and said first gear part.

18. The apparatus as claimed in claim 16, wherein each of said first gear part and said second gear part has a predetermined reduction ratio with respect to said motor shaft to produce a larger torque than that of said motor shaft.

19. The apparatus as claimed in claim 16, wherein each of said first gear part and said second gear part has a gear shaft rotatably mounted on said gear box, and a gear comprised of an elastic material, detachably and integrally coupled with said gear shaft, and having a predetermined reduction ratio with respect to said motor shaft to produce a larger torque than that of said motor shaft.

20. The apparatus as claimed in claim 16, wherein each of said first gear part and said second gear part is a frictional gearing element which shifts said rotating force from said motor shaft to said antenna by means of a friction between said motor shaft, said pair of gear parts, and said antenna.

21. The apparatus as claimed in claim 16, wherein said motor part further comprises a saw gear tightly coupled with said motor shaft, and each of said first gear part and said second gear part is a saw gearing element which shifts said rotating force from said motor shaft to said antenna by means of engaged rotations between said motor shaft, said pair of saw gearing elements, and said antenna.

22. The apparatus as claimed in claim 16, wherein said motor part further comprises a belt pulley tightly coupled with said motor shaft, said gear unit further comprises a belt, each of said first gear part and said second gear part is a belt gearing element including a belt pulley which shifts said rotating force from said motor shaft to said antenna by means of belt-driven rotations between said motor shaft, said pair of belt gearing elements, and said antenna.

23. The apparatus as claimed in claim 11, wherein said gear unit comprises a first gear and a second gear, wherein each of said first gear and said second gear is comprised of an elastic material and is integrally formed with both a gear contact portion having a cylindrical shape having a first inner diameter and a first outer diameter and an antenna contact portion having a cylindrical shape having said first inner diameter and a second outer diameter which is smaller by about an outer diameter of an antenna than said first outer diameter; a first gear shaft and a second gear shaft having a first hoop and a second hoop, respectively; and a gear box including a base plate which is to be put in contact with a top side of the motor on which the motor shaft is mounted, a coupling element formed on an edge of said base plate, for detachably and tightly coupling said gear box with said motor in a body, gear shaft brackets extending parallel with said motor shaft and bent to be parallel with said base plate, for rotatable bracketing said first gear shaft and said second gear shaft, wherein a first hole is formed at a first position of said base plate to be penetrated by said motor shaft, a second hole and a third hole are formed at a second position of said base plate to receive first edges of said first gear shaft and said second gear shaft, respectively, and a fourth hole and a fifth hole are formed at said gear shaft brackets with facing said second hole and said third hole of said base plate to receive second edges of said first gear shaft and said second gear shaft, respectively; and wherein, in a case where said pair of gear shafts coupled with said pair of gears is mounted on said gear box, said second hole and said third hole are separated like said fourth hole and fifth hole by a distance such that the antenna contact portions of said first gear and second gear are tightly engaged with said antenna and at the same time, the gear contact portions of said first gear and said second gear are tightly engaged, and said first hole and said second hole are separated by a distance such that said motor shaft can be tightly engaged with said gear contact portion of said first gear.

24. The apparatus as claimed in claim 23, wherein each of said first gear and said second gear is comprised of an elastic material and is integrally formed with both a gear contact portion having a cylindrical shape having a first inner diameter and a first outer diameter and an antenna contact portion having a cylindrical shape having a second inner diameter and a second outer diameter which is smaller by about an outer diameter of an antenna than said first outer diameter, wherein said first inner diameter is a size such that each of said gears can be tightly coupled with each of said gear shafts, wherein said second inner diameter is the same as a diameter of the portion in which said hoop of each of said gear shafts is formed, and wherein said first outer diameter is larger than that of said motor shaft to produce a larger torque with a predetermined reduction ratio with respect to said motor shaft.

25. The apparatus as claimed in claim 23, wherein said fixing means comprises:

a fixing bracket horizontally extended from an edge portion of a base plate of said gear box and bent to project in the direction of said coupling element, wherein fixing grooves are formed on both sides of the projected portion;

a shock-absorbing element comprised of an elastic material, tightly fitted into said fixing grooves and tightly inserted between an upper portion of a peripheral surface of said motor and said fixing bracket, wherein a penetration hole is formed therein; and a fixing pin tightly inserted into said penetration hole of said shock-absorbing element, for fixedly coupling said assembly of said motor and said gear unit with said antenna housing.

26. The apparatus as claimed in claim 23, wherein said motor further comprises:

a first belt pulley integrally and tightly coupled to said motor shaft;

said gear unit further comprises a belt for transferring a rotating force;

said first gear shaft and said second gear shaft further comprise a second belt pulley and a third belt pulley respectively at an inner position of said hoop thereof, wherein a diameter of each of said second belt pulley and said third belt pulley is larger than that of said first belt pulley to produce larger torque with a predetermined reduction ratio with respect to said first belt pulley; and each of said first gear and said second gear, comprised of an elastic material, has a cylindrical shape in which an inner diameter thereof has a value such that each of said gears can be tightly coupled with each of said gear shafts, and an outer diameter thereof has a value such that each of said gears can be tightly contacted with said antenna when said first gear and said second gear are mounted on said gear box through said first gear shaft and said second gear shaft, wherein said belt is belted to said three belt pulleys so that said first gear can be rotated opposite to a rotating direction of said motor shaft, and said second gear can be rotated in the same direction as the rotating direction of said motor shaft.

27. The apparatus as claimed in claim 23, wherein said motor further comprises:

a first saw gear integrally and tightly coupled to said motor shaft;

said first gear shaft and said second gear shaft further comprise a second saw gear and a third gear respectively at an inner position of said hoop thereof, wherein a diameter of each of said second saw gear and said third saw gear is larger than that of said first saw gear to produce a larger torque with a predetermined reduction ratio with respect to said first saw gear; and each of said first gear and said second gear, comprised of an elastic material, has a cylindrical shape in which an inner diameter thereof has a value such that each of said gears can be tightly coupled with each of said gear shafts, and an outer diameter thereof has a value such that each of said gears can be tightly contacted with said antenna when said first gear and said second gear are mounted on said gear box through said first gear shaft and said second gear shaft, wherein said first saw gear of said motor shaft is engaged with said second saw gear of said first gear shaft, and said second saw gear of said first gear shaft is engaged with said third saw gear of said second gear shaft.

* * * * *